US008966878B2

(12) United States Patent
Satou et al.

(10) Patent No.: US 8,966,878 B2
(45) Date of Patent: Mar. 3, 2015

(54) GAS TURBINE

(71) Applicant: Mitsubishi Heavy Industries, Ltd., Tokyo (JP)

(72) Inventors: Hideyuki Satou, Hyogo (JP); Masao Terazaki, Hyogo (JP)

(73) Assignee: Mitsubishi Heavy Industries, Ltd., Minato-Ku, Tokyo (JP)

( * ) Notice: Subject to any disclaimer, the term of this patent is extended or adjusted under 35 U.S.C. 154(b) by 0 days.

(21) Appl. No.: 13/923,884

(22) Filed: Jun. 21, 2013

(65) Prior Publication Data

US 2013/0276423 A1 Oct. 24, 2013

Related U.S. Application Data

(62) Division of application No. 11/459,565, filed on Jul. 24, 2006, now Pat. No. 8,505,274.

(30) Foreign Application Priority Data

Nov. 28, 2005 (JP) .................................. 2005-342412

(51) Int. Cl.
F02C 7/06 (2006.01)
F01D 5/08 (2006.01)
F01D 25/18 (2006.01)
F01D 25/30 (2006.01)
F02C 7/28 (2006.01)

(52) U.S. Cl.
CPC ... *F02C 7/06* (2013.01); *F01D 5/08* (2013.01); *F01D 25/183* (2013.01); *F01D 25/30* (2013.01); *F02C 7/28* (2013.01)
USPC .............................. 60/39.5; 60/805; 60/39.93

(58) Field of Classification Search
CPC ...... F05D 2270/3062; F02C 7/18; F02C 7/06; F01D 5/082; F01D 25/125; F01D 25/12
USPC ..................... 60/39.05, 805, 806, 39.83, 39.5; 415/115
See application file for complete search history.

(56) References Cited

U.S. PATENT DOCUMENTS

| 2,591,399 | A | * | 4/1952 | Howard et al. ................. 60/806 |
| 2,759,700 | A | * | 8/1956 | Wheatley ....................... 415/115 |
| 2,791,091 | A | * | 5/1957 | Wheatley et al. ............... 60/806 |
| 3,062,050 | A | * | 11/1962 | Bishop .......................... 374/144 |
| 3,527,053 | A | * | 9/1970 | Horn ............................... 60/791 |
| 3,652,178 | A | * | 3/1972 | Guillot ............................ 60/799 |
| 3,844,110 | A | * | 10/1974 | Widlansky et al. ........... 60/39.08 |
| 4,447,190 | A | * | 5/1984 | Campbell ....................... 416/95 |
| 4,456,427 | A | * | 6/1984 | Evans et al. .................... 60/806 |
| 4,465,427 | A | * | 8/1984 | Libertini et al. .............. 415/112 |

(Continued)

FOREIGN PATENT DOCUMENTS

JP 9-60532 A * 3/1997

Primary Examiner — Ted Kim
(74) Attorney, Agent, or Firm — Lowe Hauptman & Ham, LLP

(57) ABSTRACT

A compressor compresses air to produce compressed air. A mixture of fuel and the compressed air is combusted in a combustor to produce combustion gas. The combustion gas is supplied to a turbine to obtain rotational power. High-temperature gas accumulated in a space partitioned by an exhaust-side bearing portion that rotatably supports a turbine shaft and an exhaust diffuser is discharged through an exhaust gas passage. The high-temperature gas is sucked into the exhaust gas passage by exhaust gas flowing in the exhaust diffuser.

5 Claims, 6 Drawing Sheets

(56) References Cited

U.S. PATENT DOCUMENTS

| | | | |
|---|---|---|---|
| 5,224,818 A * | 7/1993 | Drerup et al. | 415/115 |
| 5,836,163 A * | 11/1998 | Lockyer et al. | 60/737 |
| 6,266,954 B1 * | 7/2001 | McCallum et al. | 60/806 |
| 2006/0239812 A1 * | 10/2006 | Friedel et al. | 415/115 |
| 2007/0107438 A1 * | 5/2007 | Morimoto et al. | 60/806 |

* cited by examiner

GAS TURBINE

BACKGROUND OF THE INVENTION

1. Field of the Invention

The present invention relates to a gas turbine that obtains rotational power by combusting a mixture of fuel and compressed air and supplying generated combustion gas to a turbine.

2. Description of the Related Art

Generally, a gas turbine includes a compressor, a combustor, and a turbine. Air taken in from an air-intake port is compressed by the compressor to form compressed air with high temperature and high pressure. Fuel is supplied to the compressed air to be combusted in the combustor. The turbine is driven by combustion gas with high temperature and high pressure, and a generator connected to the turbine is driven. The turbine includes a plurality of stator vanes and rotor blades arranged alternately in a casing. The turbine rotationally drives an output shaft coupled with the generator by driving the rotor blades utilizing the combustion gas. The combustion gas driven the turbine is converted to static pressure by a diffuser in an exhaust casing, and is discharged to the atmosphere. In this type of turbine, a turbine shaft to which the rotor blades are fixed is rotatably supported in the casing via bearing portions at inlet casing side and an exhaust casing side, respectively. Lubricant is supplied to each bearing portion and a multistage seal ring is provided near the bearing portion such that the supplied lubricant does not flow out of the bearing portion. By supplying air extracted from the compressor to the seal ring, leakage of the lubricant from the bearing portion is suppressed.

Such a gas turbine is described in Japanese Patent Application Laid-Open No. 2005-023812.

However, at the exhaust casing side in the gas turbine, an exhaust diffuser that converts the exhaust gas to static pressure to discharge the gas to the outside is provided on an outer peripheral side of the exhaust-side bearing portion, and the bearing portion is heated by exhaust gas with high temperature flowing in the exhaust diffuser. Particularly, when the gas turbine is operated with a low output for a long time, high temperature gas accumulates inside the exhaust diffuser to raise the temperature of the exhaust-side bearing portion, and lubricant supplied to the exhaust-side bearing portion is carbonized to be solidified. As a result, carbide of lubricant adheres on a seal face of the seal ring and the carbide contacts with the turbine shaft, which can generate vibrations.

SUMMARY OF THE INVENTION

It is an object of the present invention to at least partially solve the problems in the conventional technology.

A gas turbine according to one aspect of the present invention includes a compressor that compresses air to produce compressed air; a combustor that combusts a mixture of fuel and the compressed air to produce combustion gas; a turbine to which the combustion gas is supplied to obtain rotational power; and an exhaust gas passage through which high-temperature gas accumulated in a space partitioned by an exhaust-side bearing portion that rotatably supports a turbine shaft and an exhaust diffuser is discharged. The high-temperature gas is sucked into the exhaust gas passage by exhaust gas flowing in the exhaust diffuser.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. The present invention is not limited to the embodiments.

Figure 1:
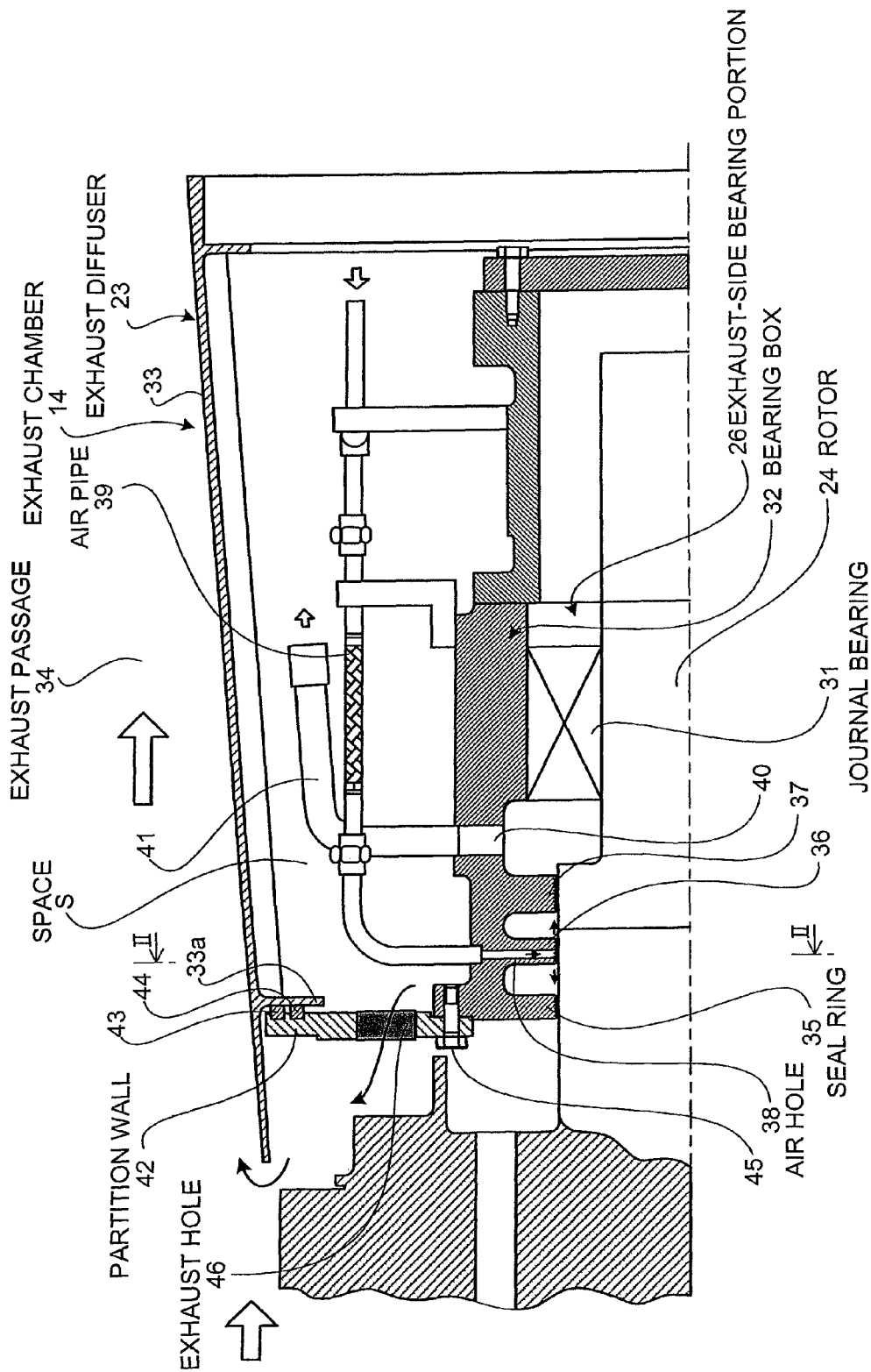
FIG. 1 is a cross section of an exhaust casing in a gas turbine according to a first embodiment of the present invention.
Figure 2:
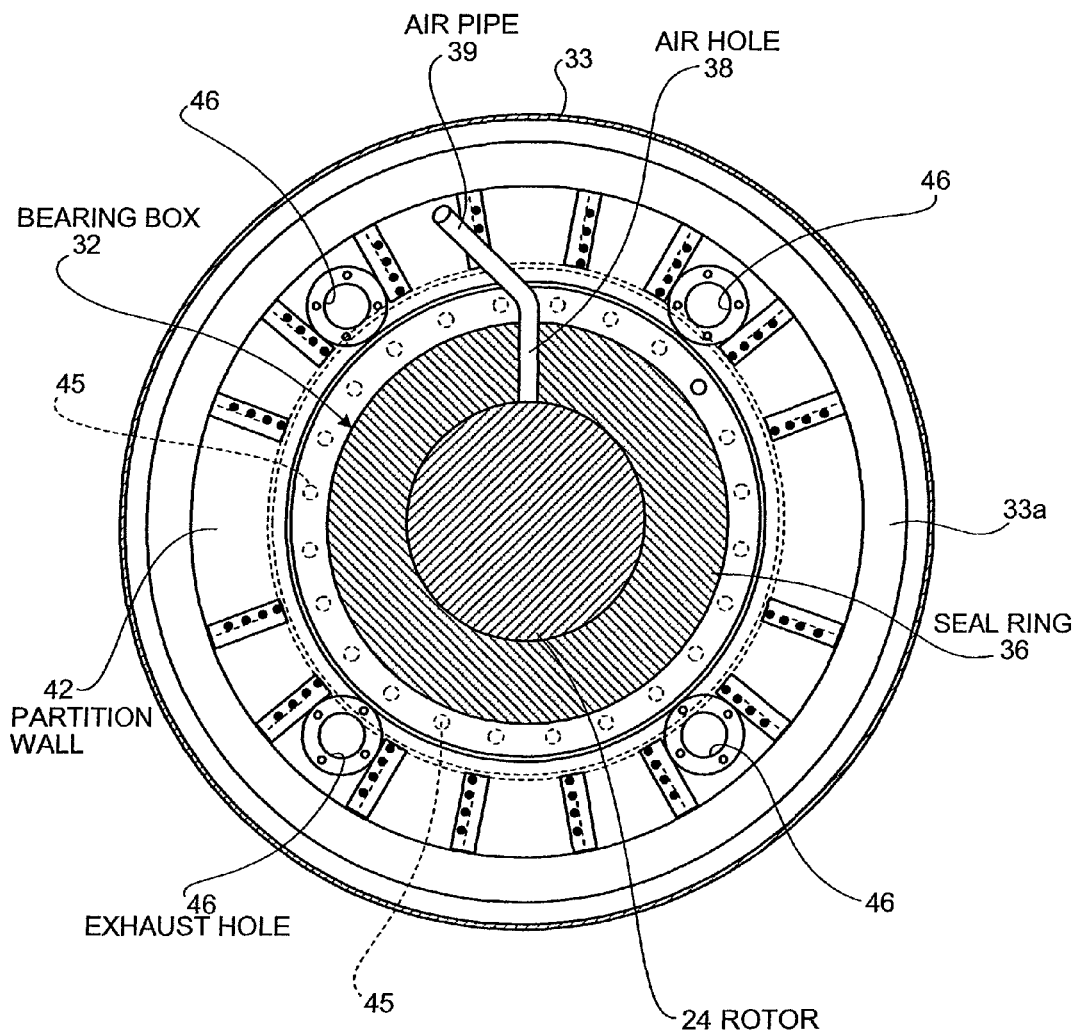
FIG. 2 is a cross section taken along a line II-II shown in FIG. 1.
Figure 3:
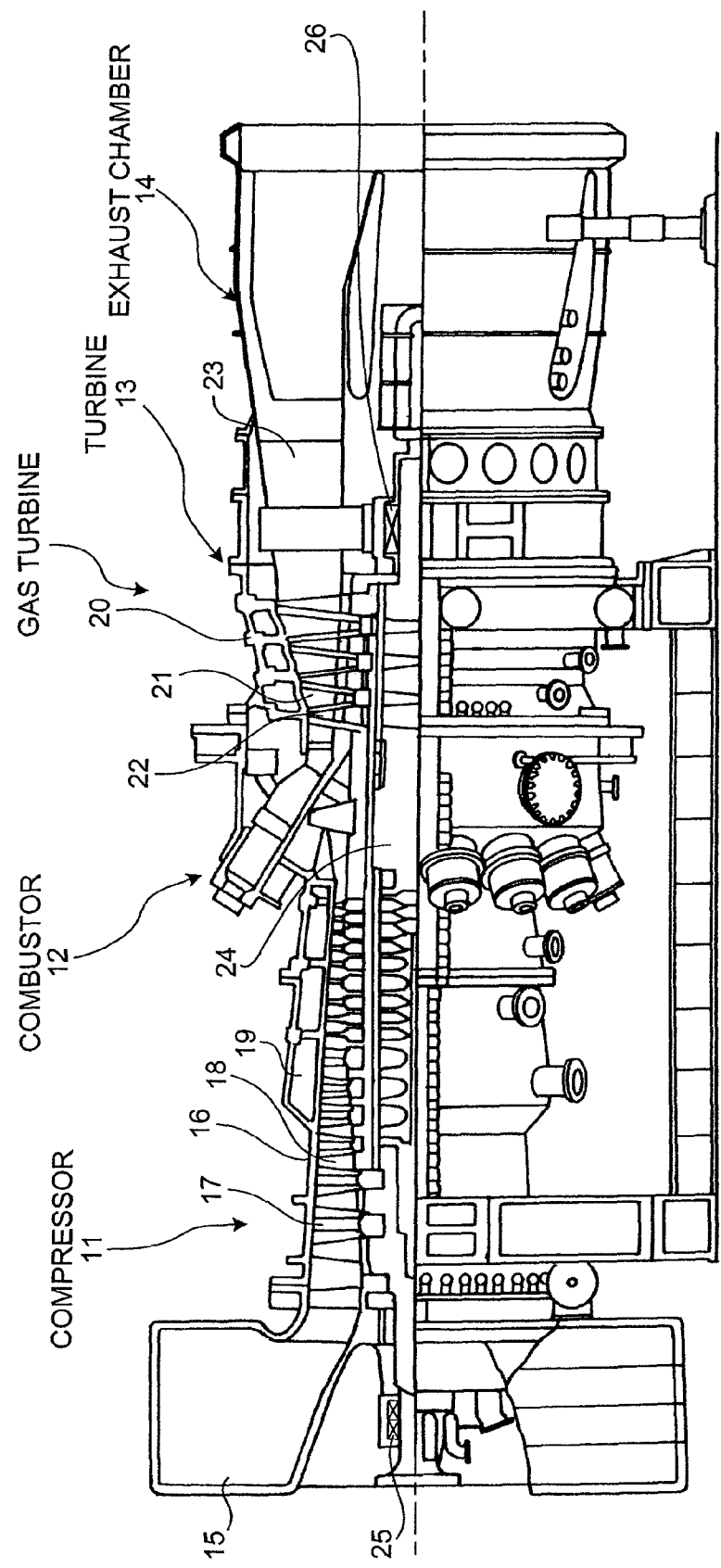
FIG. 3 is a schematic diagram of the gas turbine according to the first embodiment.

FIG. 1 is a cross section of an exhaust casing in a gas turbine according to a first embodiment of the present invention. FIG. 2 is a cross section taken along a line II-II shown in FIG. 1. FIG. 3 is a schematic diagram of the gas turbine according to the first embodiment.

As shown in FIG. 3, the gas turbine according to the first embodiment includes a compressor 11, a combustor 12, a turbine 13, and an exhaust chamber 14, in which the turbine 13 is coupled to a generator (not shown). The compressor 11 has an air-intake port 15 for taking in air, a plurality of stator vanes 17 and rotor blades 18 are alternately arranged within a compressor casing 16, and a bleed manifold 19 is provided on an outside of the compressor 11. The combustor 12 supplies fuel to compressed air compressed by the compressor 11, and combusts the fuel by igniting the fuel using a burner. In the turbine 13, a plurality of stator vanes 21 and rotor blades 22 are alternately arranged within a turbine casing 20. The exhaust chamber 14 has an exhaust diffuser 23 continuous to the turbine 13. A rotor (a turbine shaft) 24 is positioned to penetrate the centers of the compressor 11, the combustor 12, the turbine 13, and the exhaust chamber 14, and an end thereof on the compressor 11 side is rotatably supported by a bearing portion 25, while an end thereof on the exhaust chamber 14 side is rotatably supported by a exhaust-side bearing portion 26. A plurality of disk plates are fixed to the rotor 24, to which each of the rotor blades 18 and 22 is coupled, and a generator (not shown) is coupled to the rotor 24 on the compressor 11 side via a reduction gear.

Therefore, air taken in from the air-intake port 15 of the compressor 11 passes through the stator vanes 21 and the rotor blades 22 to be compressed to become compressed air with high temperature and high pressure, and the compressed air is supplied with predetermined fuel to be combusted in the combustor 12. Combustion gas with high temperature and high pressure as working fluid produced in the combustor 12, passes through the stator vanes 21 and the rotor blades 22 constituting the turbine 13 to rotationally drive the rotor 24, and drives the generator coupled to the rotor 24, while exhaust gas passes through the exhaust diffuser 23 of the exhaust chamber 14 to be discharged rearward.

On the exhaust chamber 14 side of the gas turbine thus configured, the exhaust diffuser 23 is provided on an outer periphery side of the bearing portion 26, and the bearing portion 26 is heated by exhaust gas with high temperature flowing in the exhaust diffuser 23. Lubricant supplied to the bearing portion 26 is carbonized to be solidified, and carbide of lubricant adheres on a seal face of a seal ring for preventing leakage of lubricant, which can generate vibrations due to contacting of the carbide with the rotor 24.

Therefore, in the gas turbine according to the first embodiment, an exhaust gas passage that sucks high temperature gas accumulated in a space partitioned by the bearing portion 26 that rotatably supports the rotor 24 and the exhaust diffuser 23 utilizing exhaust gas flowing in the exhaust diffuser 23 and discharges the gas, is provided. The first embodiment will be specifically explained below.

As shown in FIGS. 1 and 2, in the gas turbine according to the first embodiment, the rotor 24 is rotatably supported by a bearing box 32 via a journal bearing 31 constituting the bearing portion 26, and lubricant is supplied to the journal bearing 31. The exhaust diffuser 23 is disposed on an outer periphery side of the bearing box 32. Since the exhaust diffuser 23 is configured to include an outer cylindrical portion (not shown) and an inner cylindrical portion 33, an exhaust passage 34 is formed, and the outer cylindrical portion is fixed to a casing constituting the exhaust chamber 14.

Three seal rings 35, 36, and 37 are formed at an end portion of the bearing box 32, and seal faces thereof are positioned on an outer peripheral face of the rotor 24 so as to form a fine clearance. An air hole 38 for supplying seal air is formed on the central seal ring 36 along a diametrical direction of the ring, and an air pipe 39 is coupled to a proximal end of the air hole 38, while a distal end of the air hole 38 is opened to the seal face. The air pipe 39 is coupled to the bleed manifold 19 of the compressor 11 via a pipe (not shown), which allows supply of bleed air with predetermined pressure. A through-hole 40 opened to a space between the journal bearing 31 and the seal ring 37 is formed in the bearing box 32 along a diametrical direction, and a vapor pipe 41 is coupled to a proximal end of the through-hole 40.

Accordingly, when seal air is supplied from the air pipe 39 to the seal face of the seal ring 36 through the air hole 38, the supplied seal air passes through the seal face of the seal ring 36 and the outer peripheral face of the rotor 24 to flow toward the seal ring 35 outside the bearing box 32 and the seal ring 37 inside the bearing box 32. High temperature exhaust gas can be prevented from entering in the bearing box 32 by the seal air that has flowed from the central seal ring 36 toward the seal ring 35 outside the bearing box 32. On the other hand, leakage of the lubricant from the journal bearing 31 can be prevented by the seal air that has flowed from the central seal ring 36 toward the seal ring 37 inside the bearing box 32.

By coupling an end face of the bearing box 32 and an inner peripheral flange portion 33*a* of the inner cylindrical portion 33 in the exhaust diffuser 23 using a ring-shaped partition wall 42, a space S is partitioned between the bearing portion 26 and the exhaust diffuser 23. In this case, an outer peripheral portion of the partition wall 42 comes in close contact with the inner peripheral flange portion 33*a* of the inner cylindrical portion 33 via two ring-shaped seal members 43 and 44, while an inner peripheral portion thereof is fixed to the bearing box 32 by fastening bolts 45. By forming a plurality of exhaust holes 46 in the partition wall 42 along a circumferential direction thereof at equal intervals, an exhaust gas passage for discharging high temperature gas accumulated in the space S is provided.

Therefore, exhaust gas with high temperature and high pressure that has driven the turbine 13 is converted to static pressure in the exhaust passage 34 of the exhaust diffuser 23 to be discharged. Meanwhile, heat of the exhaust gas is transferred to the inner cylindrical portion 33 of the exhaust diffuser 23 to heat the space S. However, since the exhaust passage 34 communicates with the space S through the exhaust holes 46 formed in the partition wall 42, a sucking force of exhaust gas flowing in the exhaust passage 34 acts on the space S through each of the exhaust holes 46, so that the high temperature gas accumulated in the space S is sucked from each of the exhaust holes 46 to be discharged to the exhaust passage 34.

Therefore, the space S is prevented from being heated to an extremely high temperature, so that the lubricant supplied to the journal bearing 31 is not heated to be carbonized.

In the gas turbine of the first embodiment, by rotatably supporting the exhaust side end portion of the rotor 24 using the bearing box 32 via the journal bearing 31 serving as the bearing portion 26, disposing the exhaust diffuser 23 on the outer peripheral side of the bearing box 32, and coupling the end face of the bearing box 32 and the inner peripheral flange 33*a* of the inner cylindrical portion 33 in the exhaust diffuser 23 to each other using the partition wall 42, the space S is partitioned between the bearing portion 26 and the exhaust diffuser 23, and the exhaust gas passage for discharging high temperature gas accumulated in the space S is provided by forming the exhaust holes 46 in the partition wall 42 along the circumferential direction at equal intervals.

Accordingly, even if the space S around the bearing portion 26 is heated by high temperature exhaust gas flowing in the exhaust passage 34, since high temperature gas accumulated in the space S is sucked by exhaust gas flowing in the exhaust passage 34 via each of the exhaust holes 46 serving as exhaust gas passages to be discharged, lubricant on the bearing portion 26 is not carbonized, and occurrence of vibration at the rotor 24 is suppressed, so that the reliability can be improved.

The space S is partitioned by the bearing box 32, the inner cylindrical portion 33 of the exhaust diffuser 23, and the partition wall 42, and the exhaust holes 46 are formed in the partition wall 42. Therefore, by simply forming the exhaust holes 46 in the existing equipment, high temperature gas accumulated around the bearing portion 26 is discharged so that lubricant is not carbonized.

Since the partition wall 42 is formed in a ring shape and the exhaust holes 46 are formed in the partition wall 42 along the circumferential direction at equal intervals, high temperature gas accumulated around the bearing portion 26 can be properly discharged from the exhaust holes 46 and a temperature rise of the bearing portion 26 can be reliably suppressed.

Second Embodiment

Figure 4:
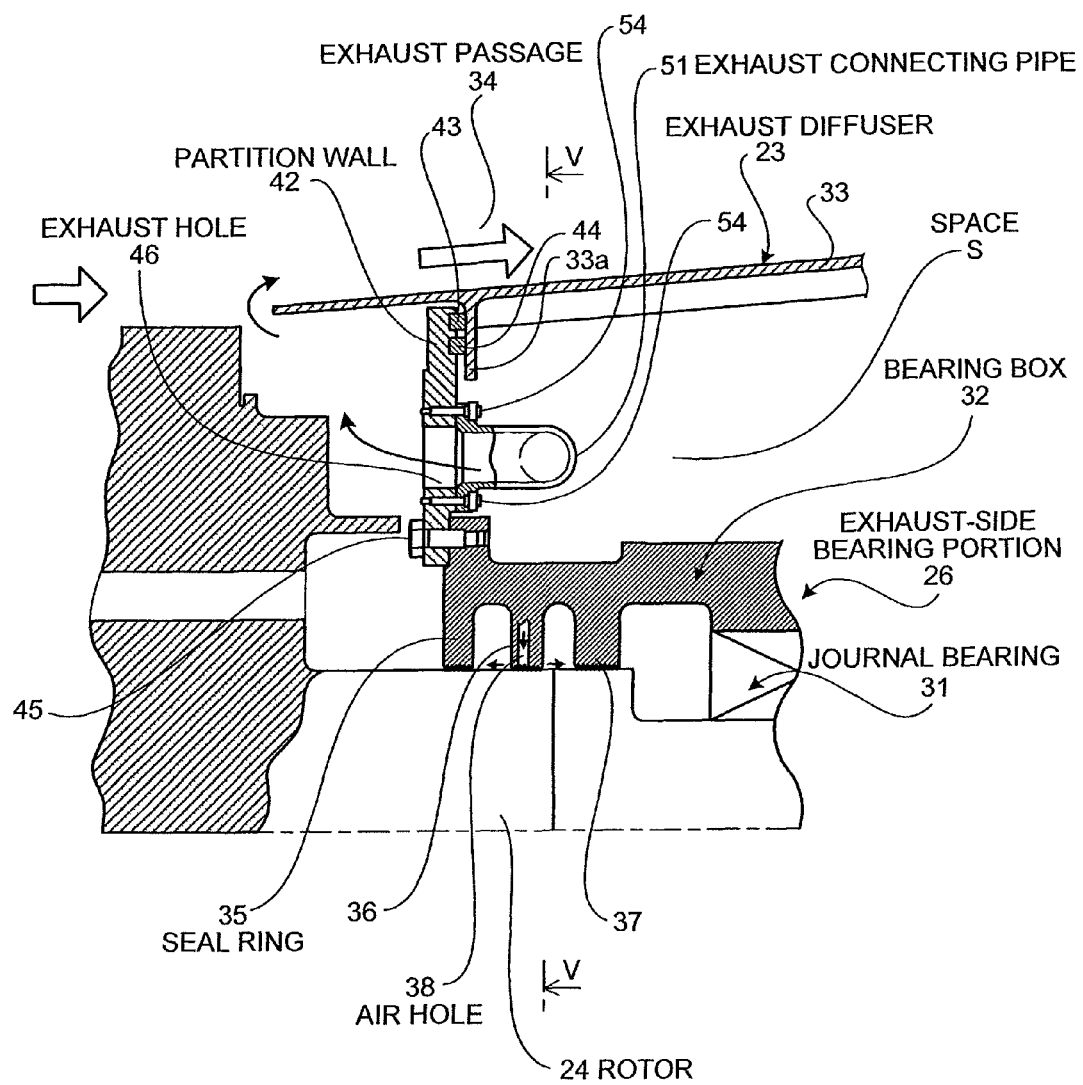
FIG. 4 is a cross section of an exhaust casing in a gas turbine according to a second embodiment of the present invention.
Figure 5:
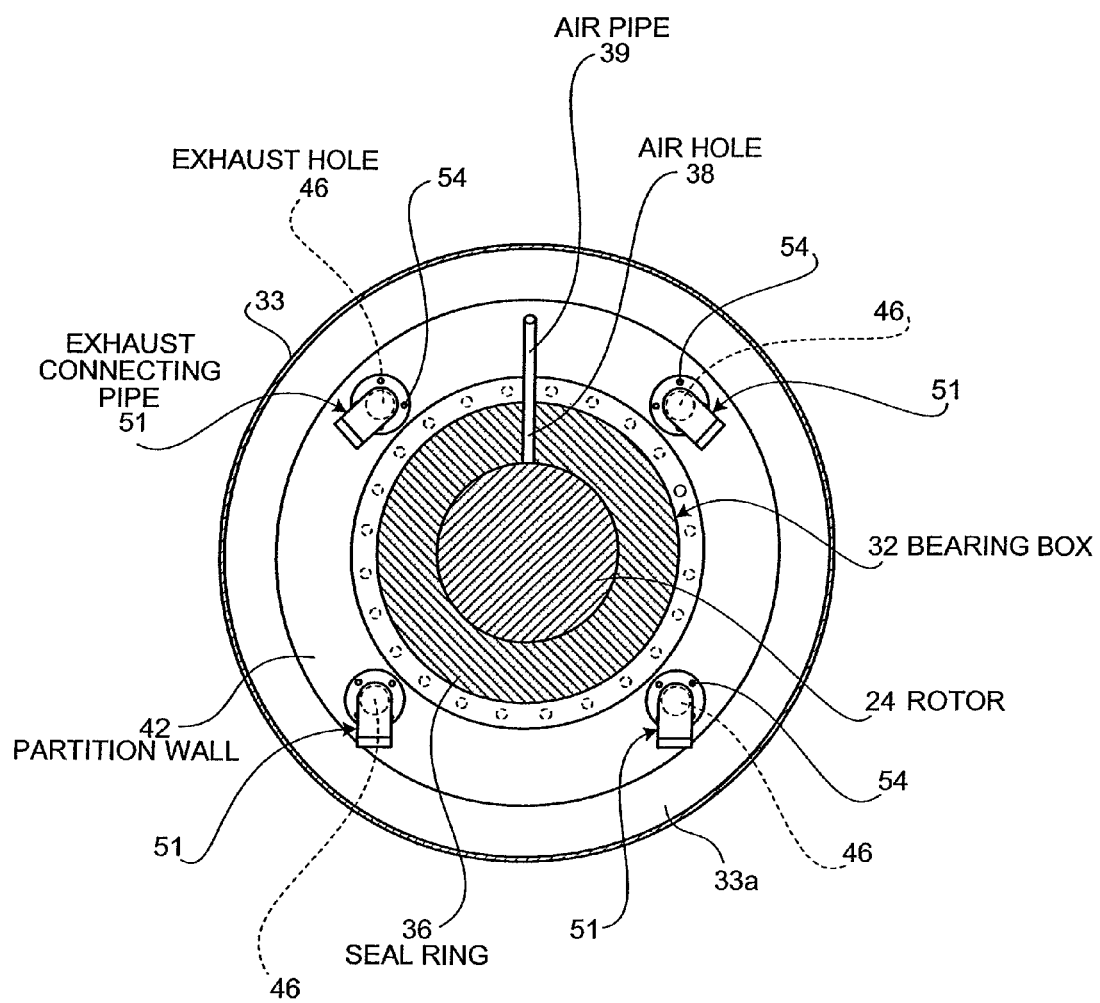
FIG. 5 is a cross section taken along a line V-V shown in FIG. 4.
Figure 6:
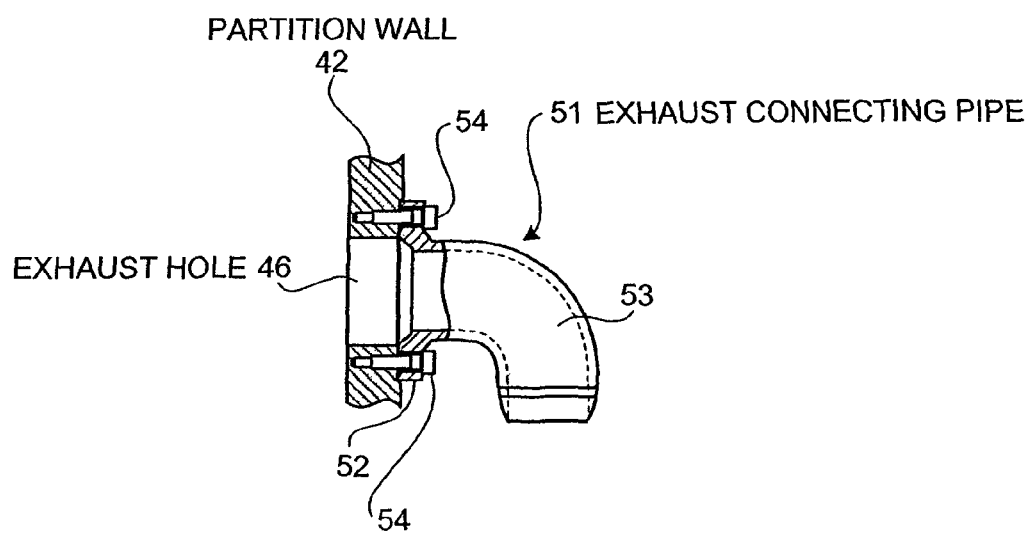
FIG. 6 is a cross section of an exhaust passage in the gas turbine according to the second embodiment.

FIG. 4 is a cross section of an exhaust casing in a gas turbine according to a second embodiment of the present invention. FIG. 5 is a cross section taken along a line V-V shown in FIG. 4. FIG. 6 is a cross section of an exhaust passage in the gas turbine according to the second embodiment. According to the second embodiment, same reference numerals denote same parts having functions similar to those in the first embodiment and redundant explanation thereof is omitted.

In the gas turbine according to the second embodiment, as shown in FIGS. 4 and 5, the rotor 24 is rotatably supported by the bearing box 32 via the journal bearing 31 constituting the bearing portion 26, and lubricant is supplied to the journal bearing 31. The exhaust passage 34 is formed by disposing the exhaust diffuser 23 on the outer peripheral side of the bearing box 32. The seal rings 35, 36, and 37 are formed in the bearing box 32, seal faces thereof are positioned to form fine clearances between the seal faces and an outer peripheral face of the rotor 24, and the air hole 38 for supplying seal air is formed in the central seal ring 36 along a diametrical direction.

By coupling an end face of the bearing box 32 and the inner cylindrical portion 33 of the exhaust diffuser 23 using the partition wall 42, the space S is partitioned between the bearing portion 26 and the exhaust diffuser 23. By forming the exhaust holes 46 in the partition wall 42 along a circumferential direction at equal intervals and fixing exhaust connecting pipes 51 so as to project in the space S corresponding to each of the exhaust holes 46 in the partition wall 42, exhaust gas passages for discharging high temperature gas accumulated in the space S is provided.

That is, each of the exhaust connecting pipes 51 is integrally formed with a pipe portion 53 bent to a mounting flange portion 52 at an approximately right angle, and it is fixed to the partition wall 42 by four fixing bolts 54. Out of the four exhaust connecting pipes 51, distal ends of the two pipes that are positioned on an upper side face downward and in a circumferential direction of the partition wall 42, while distal ends of the remaining two pipes that are positioned on a lower side face downward.

Accordingly, exhaust gas with high temperature and high pressure that has driven the turbine is converted to static pressure in the exhaust passage 34 of the exhaust diffuser 23 to be discharged. At that time, heat of the exhaust gas is transferred to the inner cylindrical portion 33 of the exhaust diffuser 23 to heat the space S. However, since the exhaust passage 34 and the space S communicate with each other via the exhaust holes 46 formed in the partition wall 42 and the exhaust connecting pipes 51, a sucking force of exhaust gas flowing in the exhaust passage 34 acts on the space S through each of the exhaust holes 46, and high temperature gas accumulated in the space S is sucked from each of the exhaust connecting pipes 51 to be discharged to the exhaust passage 34 through each of the exhaust holes 46.

Accordingly, the space S is prevented from being heated up to an extremely high temperature and lubricant supplied to the journal bearing 31 is not heated to be carbonized.

In the gas turbine according to the second embodiment, therefore, the space S is partitioned between the bearing portion 26 and the exhaust diffuser 23 by coupling the end face of the bearing box 32 and the inner cylindrical portion 33 in the exhaust diffuser 23 using the partition wall 42, and the exhaust gas passages for discharging high temperature gas accumulated in the space S are provided by forming the exhaust holes 46 in the partition wall 42 along the circumferential direction at equal intervals and fixing the exhaust connecting pipes 51 projecting in the space S to each of the exhaust holes 46.

Accordingly, even if the space S around the bearing portion 26 is heated by high temperature exhaust gas flowing in the exhaust passage 34, since high temperature gas accumulated in the space S is sucked by exhaust gas flowing in the exhaust passage 34 via each of the exhaust holes 46 and each of the exhaust connecting pipes 51 serving as the exhaust gas passages to be discharged, lubricant on the bearing portion 26 is not carbonized, and occurrence of vibration at the rotor 24 is suppressed, so that the reliability can be improved.

In this case, since the exhaust connecting pipes 51 fixed corresponding to the exhaust holes 46 project in the space S, a sucking force of exhaust gas flowing in the exhaust passage 34 securely acts on the space S through the exhaust connecting pipes 51, so that the high temperature gas accumulated in the space S can be securely discharged from the exhaust connecting pipes 51 through the exhaust holes 46, and discharge performance for high temperature gas can be improved.

Since the pipe portions 53 of each of the exhaust connecting pipes 51 are bent such that distal ends thereof face downward, even if foreign materials enter in the space S from the outside, they will not enter into the exhaust connecting pipe 51 against gravity, so that the safety is can be improved.

Figure 7:
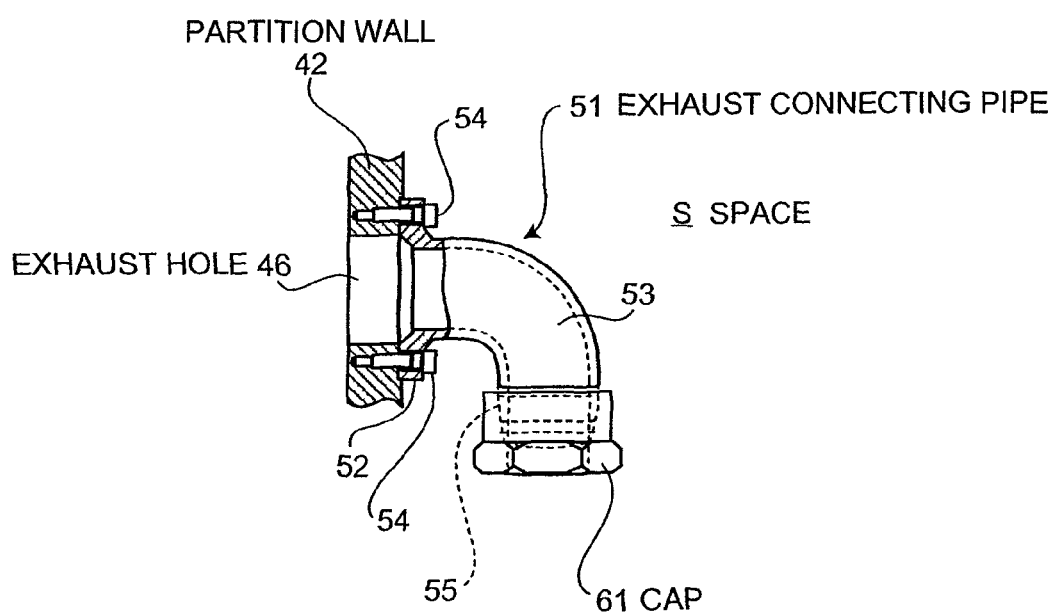
FIG. 7 is a cross section of an exhaust passage in a gas turbine according to a third embodiment of the present invention.

FIG. 7 is a cross section of an exhaust passage in a gas turbine according to a third embodiment of the present invention. According to the third embodiment, same reference numerals denote same parts having functions similar to those in the first and the second embodiments, and redundant explanation thereof is omitted.

In the gas turbine according to the third embodiment, as shown in FIG. 7, by fixing the exhaust connecting pipes 51 so as to project in the space S corresponding to each of the exhaust holes 46 of the partition wall 42, the exhaust gas passages for discharging high temperature gas accumulated in the space S is provided, and a cap 61 serving as a flow-rate adjusting unit is attached to each of the exhaust connecting pipes 51.

That is, each of the exhaust connecting pipes 51 is integrally formed with the pipe portion 53 bent to the mounting flange portion 52 at an approximately right angle, and it is fixed to the partition wall 42 by four fixing bolts 54. A threaded portion 55 is formed on a distal end outer peripheral portion of the exhaust connecting pipe 51, and the cap 61 can be screwed to be attached to the threaded portion 55 of the exhaust connecting pipe 51.

Accordingly, exhaust gas with high temperature and high pressure that has driven the turbine is converted to static pressure in the exhaust passage 34 of the exhaust diffuser 23 to be discharged. At that time, heat of the exhaust gas is transferred to the inner cylindrical portion 33 of the exhaust diffuser 23 to heat the space S. However, since the exhaust passage 34 and the space S communicate with each other via the exhaust holes 46 formed in the partition wall 42 and the exhaust connecting pipes 51, a sucking force of exhaust gas flowing in the exhaust passage 34 acts on the space S through each of the exhaust holes 46, and high temperature gas accumulated in the space S is sucked from each of the exhaust connecting pipes 51 to be discharged to the exhaust passage 34 through each of the exhaust holes 46.

By attaching the caps 61 to an appropriate number of the exhaust connecting pipes 51 of the four exhaust connecting pipes 51 according to a flow rate of exhaust gas flowing in the exhaust passage 34 of the exhaust diffuser 23, a flow rate of high temperature gas to be discharged from the space S can be adjusted. Therefore, the space S is prevented from being heated up to an extremely high temperature and lubricant supplied to the journal bearing 31 is not heated to be carbonized.

In the gas turbine according to the third embodiment, therefore, the space S is partitioned between the bearing portion 26 and the exhaust diffuser 23 by coupling the end face of the bearing box 32 and the inner cylindrical portion 33 in the exhaust diffuser 23 using the partition wall 42. The exhaust gas passages for discharging high temperature gas accumulated in the space S are provided by forming the exhaust holes 46 in the partition wall 42 along the circumferential direction at equal intervals and fixing the exhaust connecting pipes 51 projecting in the space S to each of the exhaust holes 46.

Further, the caps 61 serving as the flow-rate adjusting units can be attached to the exhaust connecting pipes 51.

Accordingly, even if the space S around the bearing portion 26 is heated by high temperature exhaust gas flowing in the exhaust passage 34, since high temperature gas accumulated in the space S is sucked by exhaust gas flowing in the exhaust passage 34 via each of the exhaust holes 46 and each of the exhaust connecting pipes 51 serving as the exhaust gas passages to be discharged, lubricant on the bearing portion 26 is not carbonized, and occurrence of vibration at the rotor 24 is suppressed, so that the reliability can be improved.

By attaching the caps 61 to an appropriate number of the exhaust connecting pipes 51 according to a flow rate of exhaust gas flowing in the exhaust passage 34 of the exhaust diffuser 23, the flow rate of high temperature gas discharged from the space S can be adjusted and the temperature in the space S can be stabilized.

According to the third embodiment, while the exhaust flow rate of high temperature gas from the space S is adjusted by attaching the caps 61 to a desired number of the exhaust connecting pipes 51 and closing the exhaust holes 46 and the exhaust connecting pipes 51, each sectional area of the passage in the exhaust connecting pipes 51 can be changed according to a rotation, amount of the caps 61.

According to the present embodiments, the space S is partitioned between the bearing portion 26 and the exhaust diffuser 23 by coupling the end face of the bearing box 32 and the inner cylindrical portion 33 in the exhaust diffuser 23 using the partition wall 42. However, this invention is not limited to this particular configuration. For example, the space S can be partitioned by deforming the bearing box 32 or a portion of the inner cylindrical portion 33 in the exhaust diffuser 23.

According to an embodiment of the present invention, the exhaust gas passage that sucks high temperature gas accumulated in the space partitioned between the exhaust-side bearing portion that rotatably supports the turbine shaft and the exhaust diffuser by utilizing exhaust gas flowing in the exhaust diffuser to discharge the gas is provided. Therefore, even if the periphery of the exhaust-side bearing portion is heated by high temperature exhaust gas flowing in the exhaust diffuser, high temperature gas accumulated in the periphery is sucked by exhaust gas flowing in the exhaust diffuser through the exhaust gas passage to be discharged, so that the lubricant in the exhaust-side bearing portion is not carbonized and occurrence of vibrations in the turbine shaft is suppressed, thereby improving reliability.

Furthermore, according to an embodiment of the present invention, the space is partitioned by the bearing box serving as the exhaust-side bearing portion, the inner cylindrical portion of the exhaust diffuser, and the partition wall coupling the end portions of the bearing box and the inner cylindrical portion on the turbine side, and the exhaust hole is formed in the partition wall as the exhaust gas passage. Therefore, high temperature gas accumulated around the exhaust-side bearing portion can be discharged to prevent carbonization of lubricant in the exhaust-side bearing portion by simply forming the exhaust hole in the existing equipment.

Moreover, according to an embodiment of the present invention, since the partition wall is formed in a ring shape and the exhaust holes are formed in the partition wall along a circumferential direction thereof at equal intervals, high temperature gas accumulated around the exhaust-side bearing portion can be properly discharged by the exhaust holes so that the temperature rise of the exhaust-side bearing portion can be suppressed.

Furthermore, according to an embodiment of the present invention, the exhaust connecting pipe projecting in the space is fixed to the exhaust hole so that a sucking force of exhaust gas flowing in the exhaust diffuser reliably acts on the space through the exhaust connecting pipe. Accordingly, high temperature gas accumulated in the space can be reliably discharged from the exhaust connecting pipes through the exhaust holes, thereby improving the discharge performance for high temperature gas.

Moreover, according to an embodiment of the present invention, since the distal end of the exhaust connecting pipe faces downward, foreign material is prevented from entering in the exhaust connecting pipe, so that the safety can be improved.

Furthermore, according to an embodiment of the present invention, the flow-rate adjusting unit is provided to the exhaust hole or the exhaust connecting pipe. Therefore, the temperature in the space, which fluctuates according to operational conditions of the gas turbine, can be stabilized by adjusting the discharge amount of high temperature gas discharged from the space by utilizing the flow-rate adjusting unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A gas turbine, comprising:
   a compressor configured to compress air to produce compressed air;
   a combustor configured to combust a mixture of fuel and the compressed air to produce combustion gas;
   a turbine having a turbine shaft configured to be rotationally driven by the combustion gas;
   an exhaust diffuser configured to exhaust the combustion gas, as exhaust gas, from the turbine;
   an exhaust-side bearing portion rotatably supporting the turbine shaft; and
   an exhaust gas passage through which high-temperature gas accumulated in a space partitioned by the exhaust-side bearing portion and the exhaust diffuser is to be discharged, wherein
   the high-temperature gas is arranged to be sucked into the exhaust gas passage by the exhaust gas flowing in the exhaust diffuser,
   the space is partitioned by
      a bearing box defining the exhaust-side bearing portion,
      an inner cylindrical portion of the exhaust diffuser, and
      a partition wall that connects end portions of the bearing box and the inner cylindrical portion on a side of the turbine,
   the exhaust gas passage includes a plurality of exhaust holes formed on the partition wall,
   the gas turbine further comprises a flow-rate control unit configured to control a flow rate of the high-temperature gas through at least one of the plurality of exhaust holes,
   the gas turbine further comprises a plurality of exhaust connecting pipes which are connected at first ends to the plurality of exhaust holes, project into the space and include the flow-rate control unit,
   each of the plurality of exhaust connecting pipes includes a pipe portion bent at a right angle,
   second ends of the exhaust connecting pipes disposed on an upper side of the partition wall face downward in a circumferential direction of the partition wall, and second ends of the exhaust connecting pipes disposed on a lower side of the partition wall face downward.

2. The gas turbine according to claim 1, wherein the flow-rate control unit is a cap that covers the second end of one of one of the plurality of exhaust connecting pipes.

3. The gas turbine according to claim 2, wherein
the cap is configured to change a size of a cross section of the second end of the exhaust connecting pipe according to an amount of rotation of the cap.

4. The gas turbine according to claim 1, wherein the second ends of the exhaust connecting pipes disposed on the upper side of the partition wall are oriented in directions oblique to a downward direction in which the second ends of the exhaust connecting pipes disposed on the lower side of the partition wall are oriented.

5. The gas turbine according to claim 4, wherein the gas turbine comprises a plurality of flow-rate control units provided to the plurality of exhaust connecting pipes, respectively, to control the flow rate of the high-temperature gas through the plurality of exhaust holes, respectively.

* * * * *